US009392192B2

(12) United States Patent
Watanabe et al.

(10) Patent No.: US 9,392,192 B2
(45) Date of Patent: Jul. 12, 2016

(54) IMAGE PROCESSING DEVICE, SERVER, AND STORAGE MEDIUM TO PERFORM IMAGE COMPOSITION

(71) Applicant: SONY CORPORATION, Tokyo (JP)

(72) Inventors: Kazuhiro Watanabe, Tokyo (JP); Yoichiro Sako, Tokyo (JP); Kohei Asada, Kanagawa (JP); Kazuyuki Sakoda, Chiba (JP); Katsuhisa Aratani, Kanagawa (JP); Takatoshi Nakamura, Kanagawa (JP); Mitsuru Takehara, Tokyo (JP); Akira Tange, Tokyo (JP); Hiroyuki Hanaya, Kanagawa (JP); Yuki Koga, Tokyo (JP); Tomoya Onuma, Shizuoka (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 14/287,712

(22) Filed: May 27, 2014

(65) Prior Publication Data
US 2014/0368671 A1 Dec. 18, 2014

(30) Foreign Application Priority Data

Jun. 14, 2013 (JP) .................................. 2013-125825

(51) Int. Cl.
*H04N 5/272* (2006.01)
(52) U.S. Cl.
CPC ..................................... *H04N 5/272* (2013.01)
(58) Field of Classification Search
CPC .......... H04N 1/00244; H04N 5/23203; H04N 5/23229; H04N 5/2625; H04N 5/2627; H04N 5/272; H04N 2005/2726; H04N 5/2723; G09G 2340/10; G09G 2340/12
See application file for complete search history.

(56) References Cited

U.S. PATENT DOCUMENTS

| 6,037,936 | A | * | 3/2000 | Ellenby | ................... G01C 17/34 348/211.8 |
| 2005/0225566 | A1 | * | 10/2005 | Kojo | ....................... G06T 13/80 345/629 |
| 2009/0060385 | A1 | * | 3/2009 | Kojo | .................. G06K 9/00342 382/284 |
| 2013/0242127 | A1 | * | 9/2013 | Kasahara | ........... H04N 5/23219 348/222.1 |
| 2014/0112534 | A1 | * | 4/2014 | Sako | ................... G06F 21/6245 382/103 |

FOREIGN PATENT DOCUMENTS

| JP | 2001-086497 | 3/2001 |
| JP | 2003-116127 | 4/2003 |
| JP | 2008-140107 | 6/2008 |
| JP | 2010-244398 | 10/2010 |

\* cited by examiner

*Primary Examiner* — Nelson D. Hernández Hernández
(74) *Attorney, Agent, or Firm* — Paratus Law Group, PLLC

(57) ABSTRACT

There is provided an image processing device including an extraction nit configured to extract an object from an image picked up by use of a certain imaging parameter, a ranging unit configured to acquire distance information indicating a distance between an image pickup unit that has picked up the image and the object that has been imaged, a communication unit having a first transmission function, a second transmission function, and a reception function, and a composition unit configured to combine the object candidate image received by the communication unit in a region of the object included in the second image.

13 Claims, 12 Drawing Sheets

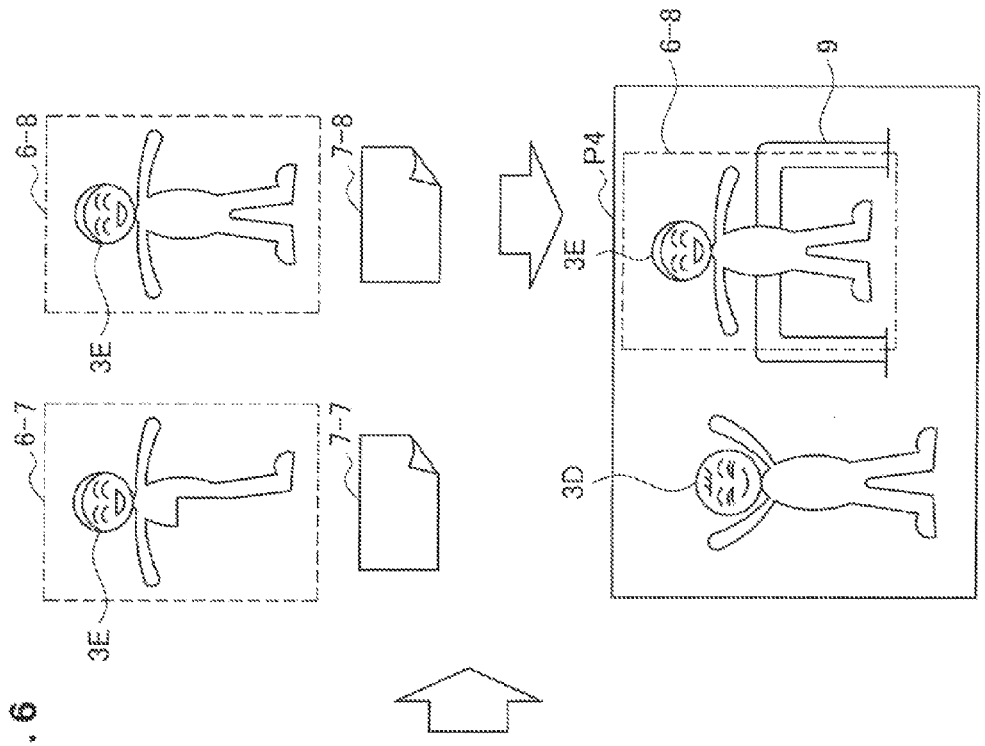
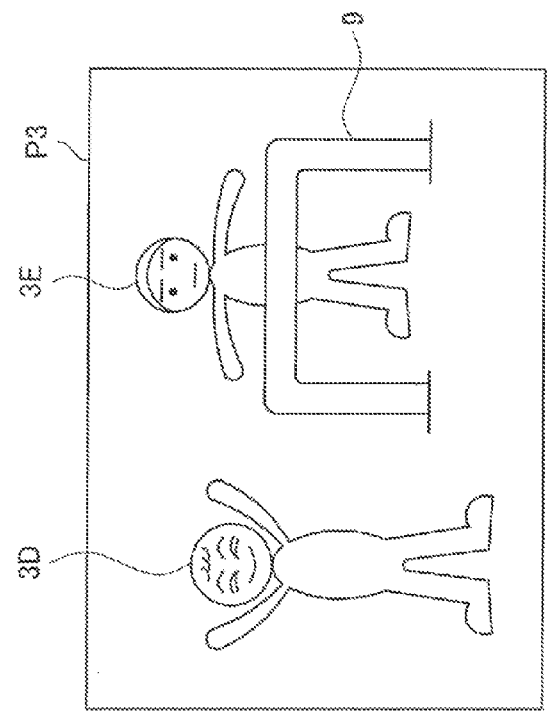
FIG. 6

IMAGE PROCESSING DEVICE, SERVER, AND STORAGE MEDIUM TO PERFORM IMAGE COMPOSITION

CROSS REFERENCE TO RELATED APPLICATIONS

This application claims the benefit of Japanese Priority Patent Application JP 2013-125825 filed Jun. 14, 2013, the entire contents of which are incorporated herein by reference.

BACKGROUND

The present disclosure elates to an image processing device, a server, and a storage medium.

In recent years, cameras having a variety of functions for picking up desired images, such as an image stabilization function, an auto focus function, and a smile detection function, have been developed in accordance a remarkable improvement in imaging performance. As one of such functions, an image composition technique has been developed to replace an object included in an image by another desired object and execute composition.

For example, JP 2008-140107A discloses a technique to detect an object included in a pickup image, a light source direction, and a shading direction and obtain a composite age of an object having the same or approximate light source direction or shading direction.

Further, JP 2001-86497A discloses a technique to perform image recognition by decomposing a pickup image into a background and objects, replace them by substitutive materials, and execute composition.

Further, JP 2010-244398A discloses a technique to search for a suitable object image on the basis of the size of an object included in a pickup image and execute composition.

Further, JP 20113-116127A discloses a technique to shoot images of a specific user automatically and provide the user with the shot video data.

SUMMARY

Unfortunately, the above disclosed techniques have difficulty in executing easy and natural image composition. For example, the techniques disclosed in JP 2001-86497A and JP 2010-244398A do not have a viewpoint of executing a natural image composition. Further, the technique disclosed in JP 2008-140107A needs a process of detecting the light source direction and the shading direction for each object, which is not easy. Furthermore, the technique disclosed in JP 2003-116127A can indeed obtain various pieces of image data of a specific user but cannot execute image composition by selecting a suitable image.

According to an embodiment of the present disclosure, there is proposed a novel and improved image processing device, server, and storage medium that can execute easier and natural image composition.

According to an embodiment of the present disclosure, there is provided an image processing device including an extraction unit configured to extract an object from an image picked up by use of a certain imaging parameter, a ranging unit configured to acquire distance information indicating a distance between an image pickup unit that has picked up the image and the object that has been imaged, a communication unit having a first transmission function that transmits an object image showing the object extracted by the extraction unit from a first image to an external device in association with object attribute information containing the distance information and the certain imaging parameter, the distance information being acquired by the ranging unit from the first image, a second transmission function that transmits a second image that is different from the first image to the external device, and a reception function that receives the object image showing the object extracted from the first image, the object image corresponding to the object included in the second image, from the external device as an object candidate image, and a composition unit configured to combine the object candidate image received by the communication unit in a region of the object included in the second image.

According to another embodiment of the present disclosure, there is provided a server including a communication unit configured to receive an image picked up by use of a certain imaging parameter and the imaging parameter from an external device, an extraction unit configured to extract an object from the image received by the communication unit, a ranging unit configured to acquire distance information indicating a distance between an image pickup unit that has picked up the image and the object that has been imaged, a record control unit configured to record an object image showing the object extracted by the extraction unit from a first image received by the communication unit in a memory unit in association with object attribute information containing the distance information and the certain imaging parameter, the distance information being acquired by the ranging unit from the first image, and a composition unit configured to combine the object image recorded in the memory unit with the image received by the communication unit. On the basis of the object attribute information containing the distance information acquired by the ranging unit from a second image that is different from the first image received by the communication unit and the certain imaging parameter, the record control unit searches the memory unit for the object image showing the object extracted from the first image, the object image corresponding to the object extracted by the extraction unit from the second image, as an object candidate image. The composition unit generates a composite image in which the object candidate image found by the record control unit is combined in a region of the object included in the second image. The communication unit transmits the composite image combined by the composition unit to the external device.

According to another embodiment of the present disclosure, there is provided a non-transitory computer-readable storage medium having a program stored therein, the program causing a computer to execute extracting an object from an image picked up by use of a certain imaging parameter, acquiring distance information indicating a distance between an image pickup unit that has picked up the image and the object that has been imaged, transmitting an object image showing the object extracted from a first image to an external device in association with object attribute information containing the distance information and the certain imaging parameter, the distance information being acquired from the first image, transmitting a second image that is different from the first image to the external device, receiving the object image showing the object extracted from the first image, the object image corresponding to the object included in the second image, from the external device as an object candidate image, and combining the received object candidate image in a region of the object included in the second image.

According to another embodiment of the present disclosure, there is provided a non-transitory computer-readable storage medium having a program stored therein, the program causing a computer to execute receiving an image picked up by use of a certain imaging parameter and the imaging parameter from an external device, extracting an object from the received image, acquiring distance information indicating a distance between an image pickup unit that has picked up the image and the object that has been imaged, recording an object image showing the object extracted from a received first image in a memory unit in association with object attribute information containing the distance information and the certain imaging parameter, the distance information being acquired from the first image, on the basis of the object attribute information containing the distance information acquired from a received second image that is different from the first image and the certain imaging parameter, searching the memory unit for the object image showing the object extracted from the first image, the object image corresponding to the object extracted from the second image, as an object candidate image, generating a composite image in which the found object candidate image is combined in a region of the object included in the second image, and transmitting the generated composite image to the external device.

According to one or more of embodiments of the present disclosure, it is possible to execute easier and natural image composition.

BRIEF DESCRIPTION OF THE DRAWINGS

FIG. 6 shows an example of a composition process according to a first embodiment;

DETAILED DESCRIPTION OF THE EMBODIMENT(S)

Figure 1:
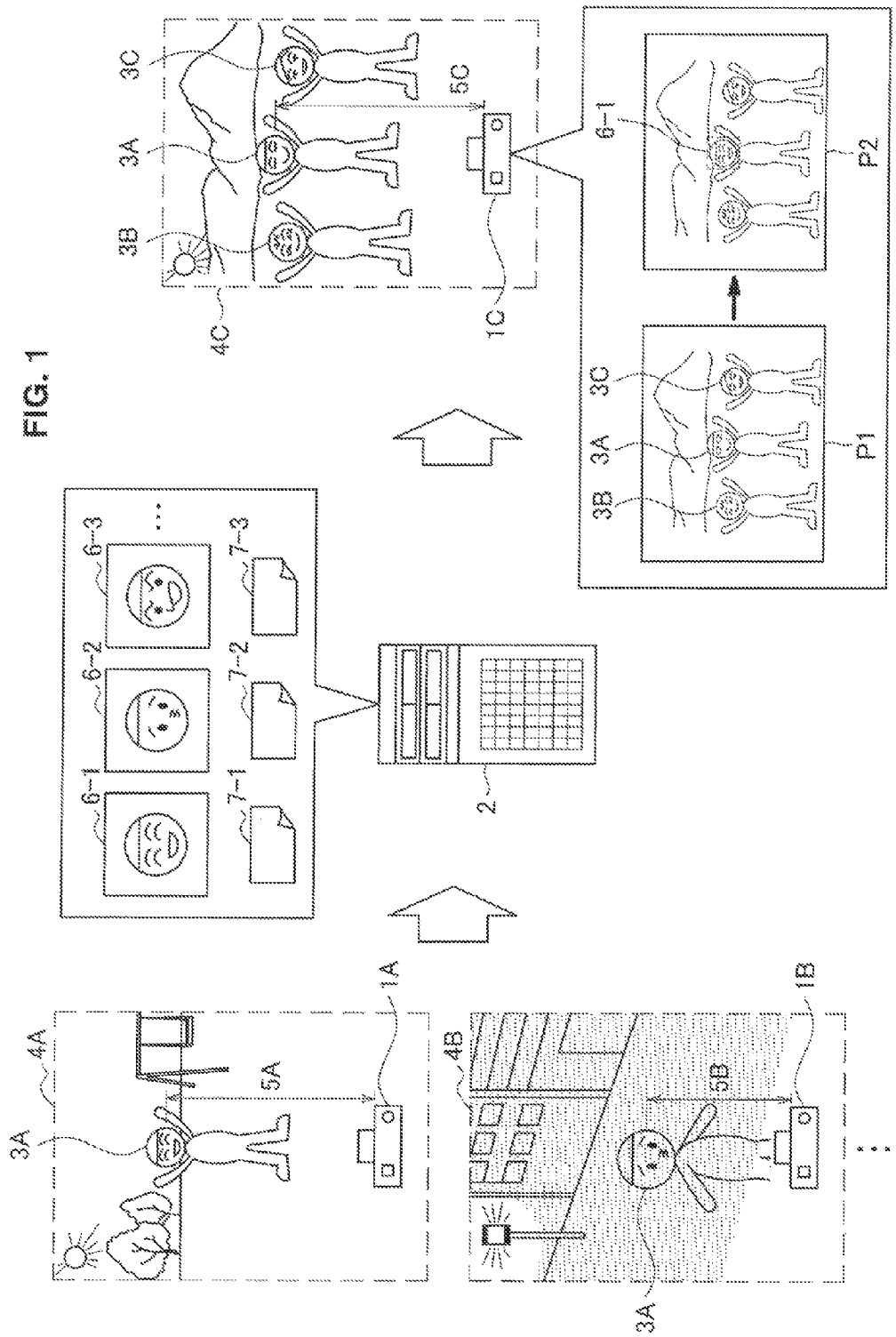
FIG. 1 shows an overview of an image composition technique according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Overview of an image composition technique according to an embodiment of the present disclosure
2. Embodiments
 2-1. First Embodiment
  2-1-1. Configuration of Image Composition System
  2-1-2. Operation process of Image Composition System
 2-2. Second Embodiment
  2-2-1. Configuration of Image Composition System
  2-2-2. Operation Process of Image Composition System
3. Conclusion 1. OVERVIEW OF AN IMAGE COMPOSITION TECHNIQUE ACCORDING TO AN EMBODIMENT OF THE PRESENT DISCLOSURE First, an overview of an image composition technique according to an embodiment of the present disclosure will be described with reference to FIG. 1.

FIG. 1 shows an overview of an image composition technique according to an embodiment of the present disclosure. As shown in FIG. 1, a camera 1C obtains an image P1 by picking up an image of subjects 3A, 3B, and 3C, but the subject 3A is blinking in the image P1. Accordingly, through a composition process according to this embodiment, the camera 1C combines an image accumulated in a server 2 with the image P1, thereby generating an image P2 in which the subject 3A is smiling. In the composition process according to this embodiment, image composition is executed by use of an image that was picked up in the past and is accumulated in the server 2. As shown in FIG. 1, in the past, a camera 1A picked up an image of the subject 3A in a scene 4A in a park during the daytime, the subject 3A being away from the camera 1A by a distance 5A, and a camera 1B picked up an image of the subject 3A in a scene 4B in downtown during the nighttime, the subject 3A being away from the camera 1B by a distance 5B. Note that, the cameras 1A, 1B, and 1C are collectively called a camera 1 when distinction therebetween is not necessary.

An image composition system according to this embodiment includes the camera 1 and the server 2. Hereinafter, a process of accumulating an image picked up by the camera 1 in the server 2 is called an accumulation process, and a process of combining the accumulated image with the pickup image is called a composition process. Note that the camera 1 which picks up an image to be accumulated and the camera 1 which picks up an image that is a composition target may be identical or different.

The server 2 stores object images showing a variety of objects that were picked up in the past. Here, the object includes a variety of bodies that can be subjects. For example, a person is an object, and parts of the person, such as an eye, an ear, a face, a hand, a leg, and a trunk, are objects. The range of one object differs depending on an image pickup distance. For example, in a case where an image of trees is picked up from a short distance, one of the leaves or one of the brunches can be an object; in a case where an image of trees is picked up from a long distance, one of the trees can be an object; in a case where an image of trees is picked up from an even longer distance, an entire forest can be an object.

The object image is an image including one object and is a region in a pickup image. In an example shown in FIG. 1, the server 2 stores an image of a face part (object) of the subject 3A as an object image 6-1 from among images picked up by the camera 1A in the scene 4A.

Further, the server 2 shown in FIG. 1 stores the object image in association with object attribute information indicating attributes of the object image. In the example shown in FIG. 1, the server 2 stores object attribute information 7-1 indicating that the image pickup distance between the camera 1A and the object (the face of the subject 3A) shown in the object image 6-1 is the distance 5A in association with the object image 6-1.

In a similar manner, the server 2 stores an object image 6-2 which is a face part of the subject 3A in the scene 4B in association with object attribute information 7-2 indicating that the image pickup distance is the distance 5B. Further, the server 2 similarly stores an object image 6-3 which is a face part of the subject 3A picked up in another scene in association with object attribute information 7-3.

The accumulation process performed by the image composition system according to this embodiment has been described above. Next, the composition process performed by the image composition system according to this embodiment will be described.

As shown in FIG. 1, the camera 1C obtains the image P1 by picking up the image of the subjects 3A, 33, and 3C away from the camera 1C by a distance 5C in a scene 4C outside during the daytime. However, the subject 3A is blinking in the image P1. Accordingly, the camera 1C sends an inquiry, to the server 2, about a suitable object image that can be used to replace the face region of the subject 3A in the image P1 by another image in which the subject 3A is not blinking.

Having received the inquiry, the server 2 first acquires the object attribute information from the object image of the face part of the subject 3A in the image P1. Then, on the basis of the acquired object attribute information, the server 2 searches for the suitable object image from the other object images that are accumulated so far. More specifically, by use of the object attribute information of the object image of the face part of the subject 3A as a search key, the server 2 searches for an object image that is associated with the same or substantially the same object attribute information and includes the face of the subject 3A. For example, in a case where the distance 5A is equal or almost equal to the distance 5C in FIG. 1, the server 2 searches for the object image 6-1 in association with the object attribute information 7-1 indicating that the image pickup distance is the distance 5A.

Next, the server 2 transmits the found object image 6-1 to the camera 1C. Then, the camera 1C combines the received object image 6-1 in the face region of the subject 3A in the image P1, thereby generating the image P2. In this manner, the camera 1C can obtain the image P2 in which the subject 3A is not blinking and is smiling. Since the image pickup distance of the face region and other object attribute information of the image P2 do not change largely before and after the composition, an unnatural image due to composition can be prevented. Note that the image P2 may be generated by the server 2 and transmitted to the camera 1C.

The object attribute information can contain, not only the image pickup distance, but also various kinds of information acquired when the object image is picked up and various kinds of information to be acquired by analyzing the object image. For example, the object attribute information can contain information on an image pickup time, an image pickup position, an image pickup direction, and an image pickup lens, smiling information indicating whether the subject is smiling or not, and the like. For example, in the example shown in FIG. 1, in response to the request from the camera 1C, the server 2 may transmit, by use of the fact that the image pickup time of the image P1 is the daytime and the subject is smiling as a search key, the object image 6-1 which was similarly picked up in the daytime and in which the subject is smiling, to the camera 1C. Although the object attribute information has been described as being acquired by the server 2, the object attribute information may be acquired by the camera 1C and transmitted to the server 2.

Here, in the technique disclosed in JP 2008-140107A, a process of detecting a light source direction and a shading direction is needed for each object. In contrast, in the above composition process, without detecting the light source direction and the shading direction, it is possible to search for a suitable object image on the basis of the image pickup time and the image pickup direction because images that are picked up at the same time and in the same direction have the same light source direction and shading direction.

The overview of the image composition technique according to an embodiment of the present disclosure has been described above. Next, a configuration and an operation process of the image composition system including the camera 1 and the server 2, the image composition system being configured to perform the accumulation process and the composition process each according to an embodiment of the present disclosure will be described with reference to FIG. 2 to FIG. 9.

2. EMBODIMENTS

2-1. First Embodiment

[2-1-1. Configuration of Image Composition System]

In this embodiment, most of processes related to the above-described composition process and accumulation process are performed in the server 2. First, a configuration of the image composition system will be described with reference to FIG. 2.

Figure 2:
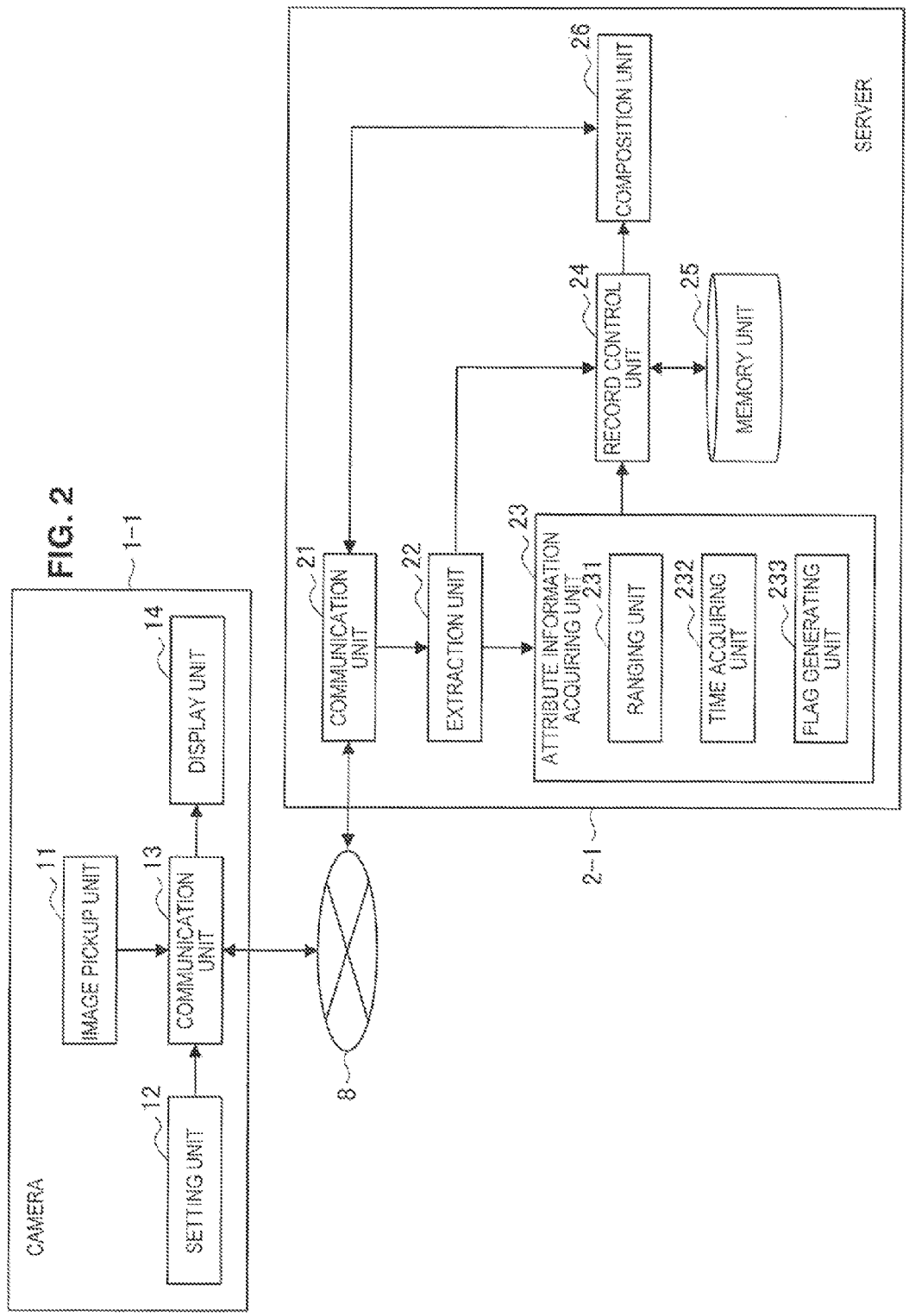
FIG. 2 is a block diagram showing a configuration of an image composition system according to a first embodiment.

FIG. 2 is a block diagram showing the configuration of the image composition system according to the first embodiment. As shown in FIG. 2, the image composition system includes a camera 1-1 (image processing device) and a server 2-1 (external device) which are mutually connected with a network 8.

(Network 8)

The network 8 includes the Internet, a dedicated line, an internet protocol-virtual private network (IP-VPN), and the like, for example.

(Camera 1-1)

As shown in FIG. 2, the camera 1-1 includes an image pickup unit 11, a setting unit 12, a communication unit 13, and a display unit 14.

Image Pickup Unit 11

The image pickup unit 11 includes a lens system including an image pickup lens, a stop, a zoom lens, a focus lens, and the like, a driving system that causes the lens system to perform a focusing operation and a zooming operation, a solid-state image sensor array that generates image pickup signals by photoelectric conversion of image pickup light obtained by the lens system, and the like. The solid-state image sensor array may be formed of a charge coupled device (CCD) sensor array or a complementary metal oxide semiconductor (CMOS) sensor array, for example.

The image pickup unit 11 according to this embodiment picks up images by use of certain imaging parameters. The imaging parameters are information related to the image pickup lens containing the shutter speed, the stop, the lens F-number, the number of CCD pixels, the focus position, the zoom rate, and the like, and information containing the image pickup date, the inclination or facing direction of the image pickup unit 11, and the like. Besides, the imaging parameters may include information similar to that of an exchangeable image file format (EXIF), such as International Organization for Standardization (ISO) speed, exposure time, and white balance. The image pickup unit 11 according to this embodiment picks up images by setting adjustable parameters from among such imaging parameters, such as the shutter speed, to a fixed value or a certain numerically limited value. This is for making a search process performed by the server 2-1 easier as described below.

The image pickup unit 11 outputs the pickup image in association with the imaging parameters at the image pickup time to the communication unit 13.

Setting Unit 12

The setting unit 12 has a function of setting the pickup image picked up by the image pickup unit 11 as a target of the accumulation process in the server 2-1 or as a target of the composition process in the server 2-1. In a case where the pickup image is set as the target of the composition process, the setting unit 12 generates composition instructing information which regulates the content of the composition process. The composition instructing information contains target object information indicating which object region in the pickup image is to be a target of the composition process and priority information indicating object attribute information that is to be prioritized when searching for a later-described object candidate image.

The setting unit 12 may set the composition instructing information on the basis of the input by a user who uses the camera 1-1 or may be set automatically depending on the content of the pickup image. For example, in a case where the subject in the pickup image is blinking or not smiling, the setting unit 12 sets the composition instructing information containing target object information indicating the face region of the subject and the priority information to prioritize a smiling image. Besides, in a case where the pickup image is taken in backlight, the setting unit 12 sets the composition instructing information containing priority information related to the position and direction of a light source so that an object image taken in follow light can be prioritized.

Meanwhile, in a case where the pickup image picked up by the image pickup unit 11 is set as the target of the accumulation process, the setting unit 12 generates accumulation instructing information indicating that the pickup image is the target of the accumulation process.

The setting unit 12 outputs the generated composition instructing information or accumulation instructing information to the communication unit 13.

Communication Unit 13

The communication unit 13 is a communication module for transmitting and receiving data to/from another information processing device with or without wires. For example, the communication unit 13 is connected to a local area network (LAN), a telephone line, or the like, to communicate with the server 2-1 via the network 8.

In a case where the setting unit 12 outputs the accumulation instructing information, the communication unit 13 transmits a pickup image (a first image) output from the image pickup unit 11 to the server 2-1 in association with the imaging parameters and the accumulation instructing information.

Meanwhile, in a case where the setting unit 12 outputs the composition instructing information, the communication unit 13 transmits a pickup image (a second image) output from the image pickup unit 11 to the server 2-1 in association with the imaging parameters and the composition instructing information, Thus, the composition process which will be specifically described later is performed on the transmitted pickup image in the server 2-1, and the generated composite image is transmitted to the communication unit 13. The communication unit 13 outputs the received composite image to the display unit 14.

Display Unit 14

The display unit 14 displays the pickup image picked up by the image pickup unit 11 in real time and displays the composite image output from the communication unit 13, for example. The display unit 14 is formed of for example, a liquid crystal display (LCD) or an organic light-emitting diode (OLED).

The configuration of the camera 1-1 has been described above. Next, a configuration of the server 2-1 will be described.

(Server 2-1)

As shown in FIG. 2, the server 2-1 includes a communication unit 21, an extraction unit 22, an attribute information acquiring unit 23, a record control unit 24, a memory unit 25, and a composition unit 26.

Communication Unit 21

The communication unit 21 is a communication module for transmitting and receiving data to/from another information processing device with or without wires. For example, the communication unit 21 is connected to a LAN, a telephone line, or the like, to communicate with the camera 1-1 via the network 8.

More specifically, the communication unit 21 receives the pickup image, the imaging parameters, and the accumulation instructing information or the composition instructing information from the camera. 1-1. Further, the communication unit 21 transmits the composite image output from the later-described composition unit 26 to the camera 1-1.

The communication unit 21 outputs the received pickup image, imaging parameters, and accumulation instructing information or composition instructing information to the extraction unit 22 and the composition unit 26.

Extraction Unit 22

The extraction unit 22 has a function of extracting an object from an image. The extraction unit 22 extracts an object from the pickup image received by the communication unit 21 through pattern recognition, machine learning, and the like. Besides, the extraction unit 22 may extract an object from the pickup image by recognizing an edge portion as a borderline of the object on the basis of distance information for each pixel acquired by a later-described ranging unit 231.

The extraction unit 22 outputs the extracted object and the imaging parameters output from the communication unit 21 to the attribute information acquiring unit 23. Further, the extraction unit 22 outputs the extracted object, the imaging parameters, and the accumulation instructing information or the composition instructing information to the record control unit 24. Note that the extraction unit 22 may output an object image showing the extracted object or information indicating the range of the object in the pickup image.

Attribute Information Acquiring Unit 23

The attribute information acquiring unit 23 has a function of acquiring object attribute information from the object extracted by the extraction unit 22. The attribute information acquiring unit 23 serves as the ranging unit 231, a time acquiring unit 232, and a flag generating unit 233.

Ranging Unit 231

The ranging unit 231 has a function of acquiring distance information indicating the distance (image pickup distance) between the image pickup unit 11 which has picked up the received pickup image and an object that has been imaged. For example, the ranging unit 231 acquires the distance information by estimating the distance on the basis of the imaging parameters. In a case where the imaging parameters include the image pickup distance, the ranging unit 231 may acquire the distance information from the imaging parameters. Alternatively, the ranging unit 231 may estimate the image pickup distance on the basis of light and shade or a difference in luminance in the pickup image. Further alternatively, the ranging unit 231 may specify an object such as a mountain or a building included in the pickup image through image recognition and estimate the distance on the basis of global positioning system (GPS) information of the object. The ranging unit 231 may acquire the distance information of the object by ac ring the distance information of the object and averaging the image pickup distance in object unit, for example.

The ranging unit 231 outputs the acquired distance information to the record control unit 24.

Time Acquiring Unit 232

The time acquiring unit 232 has a function of generating time information indicating the time at which the image of the object is picked up. The time acquiring unit 232 acquires the image pickup time included in the imaging parameters and generates the time information.

The time acquiring unit 232 outputs the generated time information to the record control unit 24.

Flag Generating Unit 233

The flag generating unit 233 has a function of generating flag information indicating whether the object extracted by the extraction unit 22 is a foreground or not. Here, the foreground means the forefront of the image. In a case where no obstacle exists between the object and the image pickup unit which picks up the image of the object, the flag generating unit 233 generates flag information indicating that the object is the foreground, Meanwhile, in a case where the object is not the forefront of the image, the flag generating unit 233 generates flag information indicating that the object is a background. For example, the flag generating unit 233 generates the flag information in which, on the basis of the imaging parameters and the distance information of the object acquired by the ranging unit 231, an object at the shortest distance among overlapping objects is set as the foreground and the other objects are set as the background.

Although in this specification, an example in which two kinds of the flag information, which are the foreground and the background, is described, the flag information may be of more kinds. For example, the flag generating unit 233 may generate, on the basis of the image pickup distance for each object, flag information which expresses a hierarchical structure in the image more specifically, such as "foreground at short distance", "foreground at long distance", "background at short distance", and "background and long distance".

The flag generating unit 233 outputs the generated flag information to the record control unit 24.

Memory Unit 25

The memory unit 25 is a part which records and reads out data in a certain recording medium. The memory unit 25 is formed as a hard disc drive (HDD), for example. It is needless to say that the recording medium can be any of the following various media: a solid-state memory such as a flash memory, a memory card incorporating a fixing memory, an optical disc, a magneto-optical disc, a hologram memory, and the like. The memory unit 25 is configured so as to execute record and reproduction in accordance with an employed recording medium.

The memory unit 25 records the object image in association with the object attribute information and reads out the object image under control of the record control unit 24 which will be described below.

Record Control Unit 24

The record control unit 24 has a function of recording information in the memory unit 25 and reading out the information recorded in the memory unit 5 on the basis of the accumulation instructing information or the composition instructing information received from the camera 1-1.

In a case where the accumulation instructing information is received, the record control unit 24 records the object image showing the object extracted by the extraction unit 22 in the memory unit 25 in association with the object attribute information. Here, the object attribute information contains information related to the image pickup lens of the camera 1-1, the imaging parameters including the inclination and direction of the image pickup unit 11. The object attribute information also contains the distance information, time information, and flag information output from the attribute information acquiring unit 23. The object attribute information further contains identification information for identifying an object.

For example, the record control unit 24 specifies an object through image recognition of the object image, and gives the same identifying information when the same object is recorded in the memory unit 25, and gives new identification information when the same object is not recorded in the memory unit 25. Here, in a case where the camera 1-1 has unique camera identification information, since the same person may highly possibly be imaged by the same camera 1-1, the record control unit 24 may refer to the camera identification information to specify the object. Note that the identification information may be acquired by the attribute information acquiring unit 23.

Examples of the object attribute information recorded in the memory unit 25 in association with the object image are shown below.

Imaging Parameters:
shutter speed, stop, lens F-number, number of CCD pixels, focus position, zoom rate, inclination and direction of image pickup unit 11, ISO speed, exposure time, white balance, etc.
flag information
distance information
time information
identification information The above object attribute information is just an example and may contain other given information. For example, the object attribute information may contain the position and angle of a light source such as the sun or a streetlight at the time of picking up an image, contrast information, information indicating whether the subject is a moving body or a static body, information indicating the kind of the object, such as a human, an animal, or a plant, and the like.

Meanwhile, in a case where the composition instructing information is received, the record control unit 24 searches the memory unit 25 for the object image that corresponds to the object extracted by the extraction unit 22 on the basis of the object attribute information containing the distance information, time information, imaging parameters, and the like. Here, the record control unit 24 searches, as a candidate of the composition process, for the object image that corresponds to the object shown by target object information contained in the composition instructing information. Hereinafter, the object image obtained through the search by the record control unit 24 at this time is also called an object candidate image.

More specifically, the record control unit 24 searches, as the object candidate image, for the object image recorded in the memory unit 25 in association with the object attribute information that is suitable for the object attribute information of the object in the received pickup image. For example, the record control unit 24 searches for the object candidate image in association with such object attribute information that the identification information is the same as that of the object in the received pickup image and the imaging parameters, the image pickup distance, the image pickup time, and whether the object is the foreground or the background is the same as or similar to those of the object in the received pickup image. Here, as described above, since the camera 1-1 picks up an image by use of the certain imaging parameters, the imaging parameters are not excessively various. Accordingly, the record control unit 24 can search for the object candidate image in association with the same or similar object attribute information easily.

At this time, on the basis of the prioritized object attribute information indicated by the priority information contained in the composition instructing information, the record control unit 24 searches for an object candidate image having the same or similar prioritized object attribute information. For example, in a case where the prioritized object attribute information is the distance information, the record control unit 24 searches for an object candidate image having the same or similar image pickup distance. Besides, in a case where it is instructed that the priority information is the flag information being the foreground, the record control unit 24 searches for a corresponding object candidate image of the foreground, even when the object in the received pickup image is the background.

Then, the record control unit 24 outputs the found object candidate image to the composition unit 26. At this time, the record control unit 24 also outputs the object attribute information that has been recorded in the memory unit 25 in association with the object candidate image to the composition unit 26.

Composition Unit 26

The composition unit 26 has a function of combining the object image recorded in the memory unit 25 with the pickup image that is received by the communication unit 21 together with the composition instructing information. More specifically, the composition unit 26 generates a composite image in which the object candidate image that was found by the record control unit 24 is combined in a region of the object in the pickup image indicated by the target object information contained in the composition instructing information. Here, since the object attribute information of a region of an image that is the composition target is the same as or similar to that of the object candidate image, the size, contrast, angle, and the like of the imaged object is the same or similar. Thus, the composition unit 26 can execute natural image composition without adjusting the size or correcting the contrast, for example. Note that in order to execute more natural image composition, the composition unit 26 may additionally adjust the size or correct the contrast, for example. In this manner, the composition unit 26 can execute easy and natural image composition.

Various cases can be considered for the composition process of objects performed by the composition unit 26. For example, the composition unit 26 can replace an object included in a pickup image by a corresponding object recorded in the memory unit 25. Alternatively, the composition unit 26 can delete an object included in a pickup image and compensate for the lacking part due to the delete with an object recorded in the memory unit 25. Further, the composition unit 26 may add a new object to the pickup image.

The composition unit 26 outputs the generated composite image to the communication unit 21. As described above, the communication unit 21 transmits back the composite image generated by the composition unit 26 to the camera 1-1 which has transmitted the pickup image together with the composition instructing information.

The configuration of the image composition system according to this embodiment has been described above. Next, an operation process of the image composition system according to this embodiment will be described with reference to FIG. 3 to FIG. 9.

[2-1-2. Operation Process of Image Composition System]

The operation process according to this embodiment is divided into the accumulation process in which the server 2-1 accumulates the object image and the composition process in which the server 2-1 executes image composition by use of the accumulated object image. First, the accumulation process will be described below with reference to FIG. 3 and FIG. 4.

(Accumulation Process)

Figure 3:
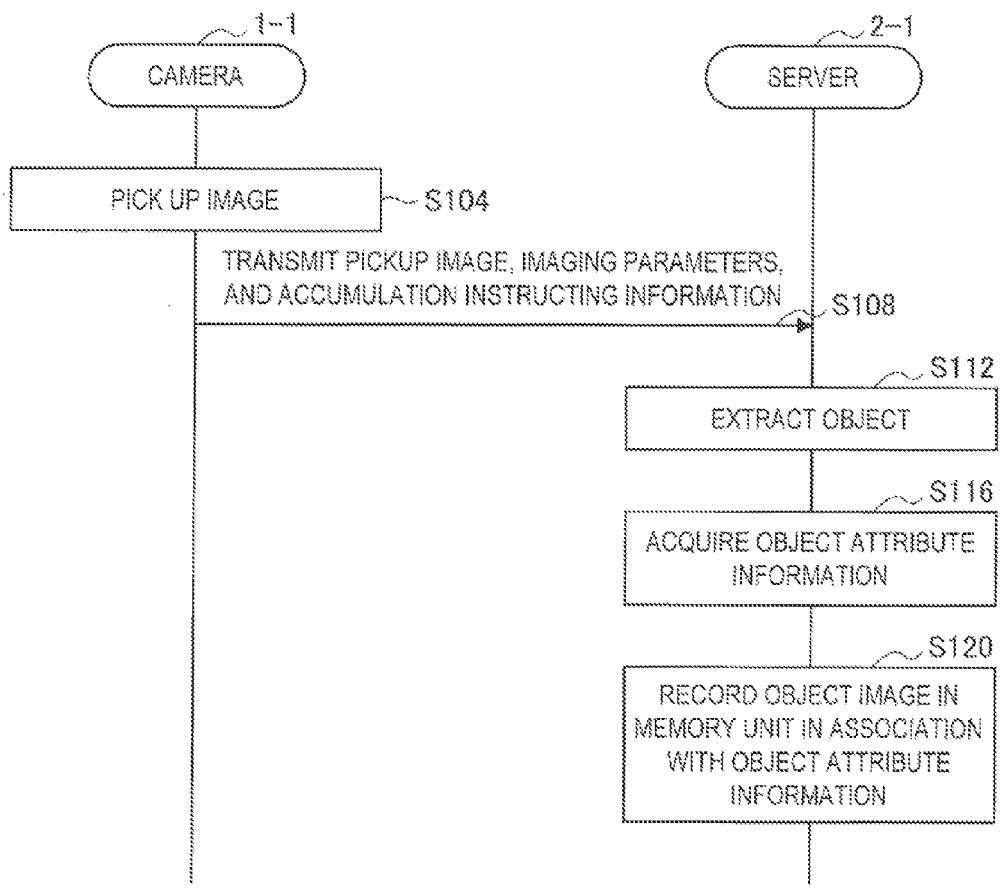
FIG. 3 is a flowchart showing an accumulation process according to a first embodiment.

FIG. 3 is a flowchart showing an accumulation process according to the first embodiment. As shown in FIG. 3, first, in step S104, the image pickup unit 11 of the camera 1-1 picks up an image by use of certain imaging parameters.

Next, in step S108, the communication unit 13 of the camera 1-1 transmits the pickup image to the server 2-1 in association with the imaging parameter and the accumulation instructing information.

Next, in step S112, the extraction unit 22 of the server 2-1 extracts an object from the received pickup image, and then in step S116, the attribute information acquiring unit 23 of the server 2-1 acquires the object attribute information for each object. Here, the operation process in steps S112 and S116 will be specifically described with reference to FIG. 4.

Figure 4:
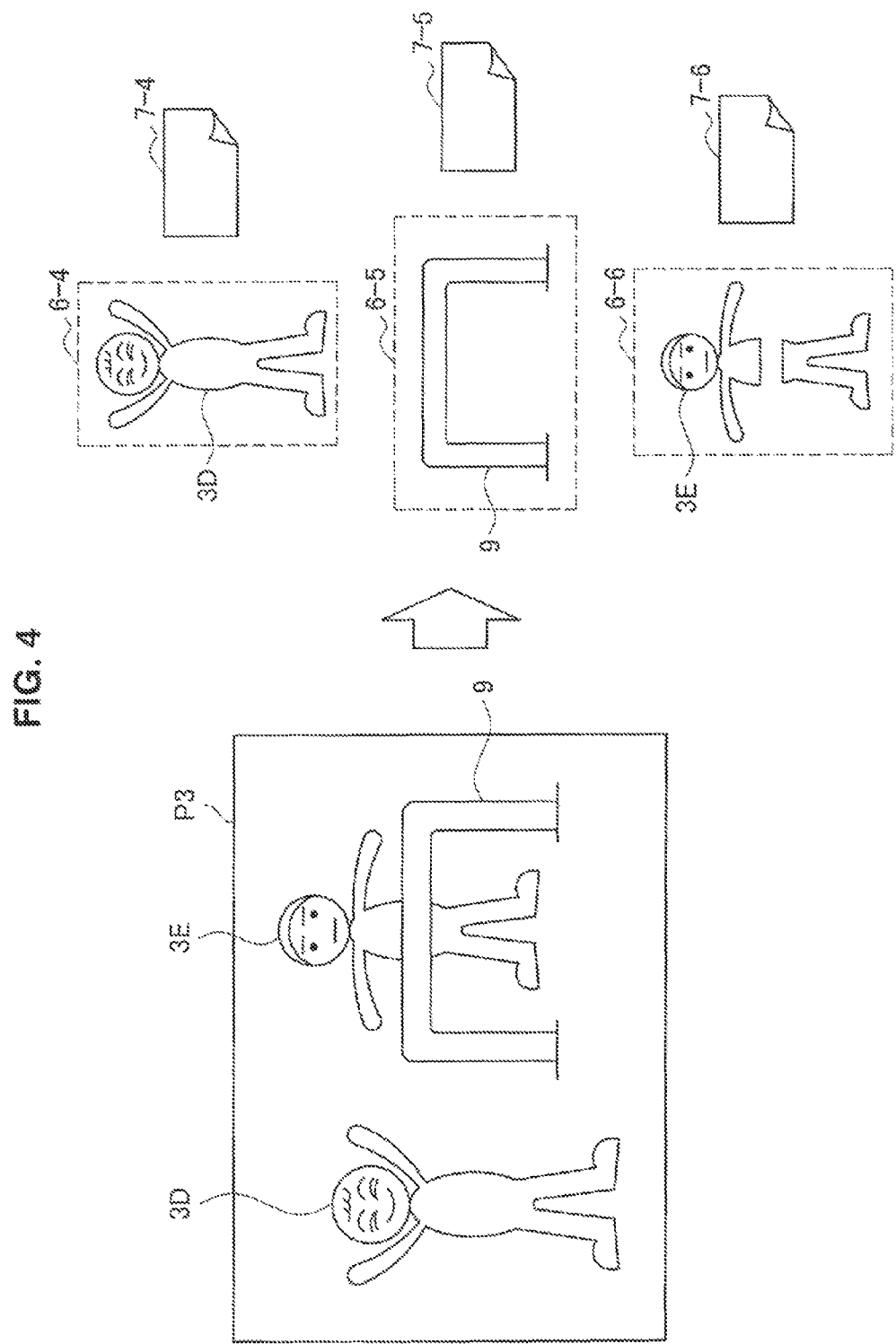
FIG. 4 shows an example of an object extracting process and a process of acquiring object attribute information each according to a first embodiment.

FIG. 4 shows an example of an object extracting process and a process of acquiring the object attribute information each according to the first embodiment. As shown in FIG. 4, an image P3 is picked up by the camera 1-1. In the image P3, a subject 3D and a fence 9 are imaged in the forefront, and a subject 3E is imaged behind the fence 9.

The extraction unit 22 extracts object images 6-4, 6-5, and 6-6 from the image P3. Here, the object image 6-4 includes the subject 3D, the object image 6-5 includes the fence 9, and the object image 6-6 includes the subject 3E. Here, since the subject 3E in the object image 6-6 stands behind the fence 9 at the time of picking up the image, an image of a part of the trunk is not picked up and is lacking.

Accordingly, the flag generating unit 233 generates flag information indicating that the object images 6-4 and 6-5 are the foreground and that the object image 6-6 is the background. Further, the ranging unit 231 acquires the distance information of each object, and the time acquiring unit 232 acquires the time information of each object. In this manner, the attribute information acquiring unit 23 acquires pieces of object attribute information 7-4, 7-5, and 7-6 related to the extracted object images 6-4, 6-5, and 6-6, respectively.

Let us go back to the description of the flowchart in FIG. 3. After steps S112 and S116 described above, in step S120, the record control unit 24 records the object images extracted by the extraction unit 22 in the memory unit 25 in association with the object attribute information. Here, the object attribute information recorded in the memory unit 25 contains the information acquired by the attribute information acquiring unit 23, the imaging parameters received by the communication unit 21, and identification information of the objects.

The accumulation process performed by the image composition system has been described above. Next, the composition process performed by the image composition system will be described with reference to FIG. 5 to FIG. 9.

(Composition Process)

Figure 5:
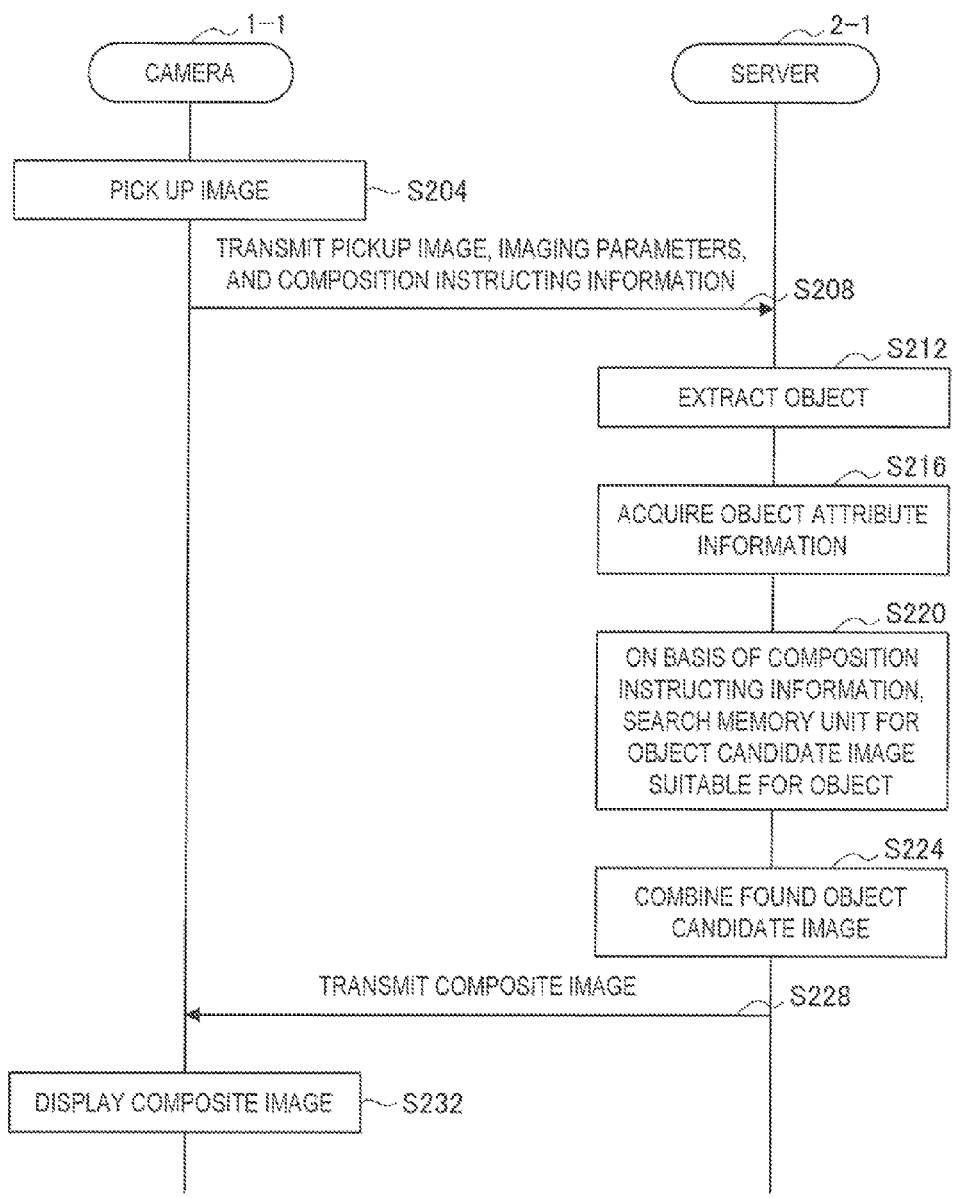
FIG. 5 is a flowchart showing a composition process according to a first embodiment.

FIG. 5 is a flowchart showing the composition process according to the first embodiment. As shown in FIG. 5, first, in step S204, the camera 1-1 picks up an image by use of certain imaging parameters.

Next, in step S208, the camera 1-1 transmits the pickup image to the server 2-1 in association with the imaging parameters and the composition instructing information.

Next, in step S212, the extraction unit 22 of the server 2-1 extracts an object from the received pickup image, and then in step S216, the attribute information acquiring unit 23 acquires the object attribute information.

Next, in step S220, on the basis of the composition instructing information, the record control unit 24 searches the memory unit 25 for an object candidate image that is suitable for the object that is the composition target. More specifically, on the basis of the prioritized object attribute information indicated by the priority information contained in the composition instructing information, the record control unit 24 searches for the object candidate image having the same or similar prioritized object attribute information.

Then, in step S224, the composition unit 26 combines the object candidate image found by the record control unit 24 in a region of the object that is the composition target in the pickup image received from the camera 1-1, thereby generating a composite image.

Note that specific operation processes in steps S220 and S224 will be described later in detail.

Next, in step S228, the communication unit 21 of the server 2-1 transmits the composite image generated by the composition unit 26 to the camera 1-1.

Next, in step S232, the display unit 14 of the camera 1-1 displays the composite image received from the server 2-1.

The composition process performed by the image composition system has been described above. Next, the specific operation processes in steps S220 and S224 in FIG. 5 will be described with reference to FIG. 6 to FIG. 9. First, replacement of objects, which is one example of the composition process, will be described with reference to FIG. 6.

Replacement of Objects

FIG. 6 shows an example of the composition process according to the first embodiment. As shown in FIG. 6, the server 2-1 performs the composition process targeting the image P3 described above with reference to FIG. 4. Note that the server 2-1 has received, together with the image P3, the composition instructing information containing the target object information indicating that the subject 3E is the target of replacement and the priority information indicating that the foreground is to be prioritized, from the camera 1-1.

In this case, first, the extraction unit 22 extracts the object images 6-4, 6-5, and 6-6 from the image P3 as described above with reference to FIG. 4, and acquires the respective pieces of the object attribute information (steps S212 and S216). Next, the record control unit 24 searches the memory unit 25 for the object candidate image corresponding to the object image 6-6 including the subject 3E which is the target of replacement.

Here, the server 2-1 has recorded, through a previous accumulation process, object images 6-7 and 6-8 in the memory unit 25 in association with object attribute information that is the same as or similar to the object attribute information of the object image 6-6 except for the flag information. The object image 6-7 is in association with object attribute information 7-7 containing flag information indicating that the object is the background, and an image of a right side below the chest of the imaged subject 3E is not picked up owing to a certain obstacle present at the time of picking up the image. Further, the object image 6-8 is in association with object attribute information 7-8 containing flag information indicating that the object is the foreground, and the imaged subject 3E has no part that is not imaged because there are no obstacles at the time of picking up the image.

On the basis of the priority information indicating that the foreground is to be prioritized, the record control unit 24 searches, as the object candidate image, for the object image 6-8 in association with the flag information indicating that the object is the foreground, from among the object images 6-7 and 6-8. Then, the composition unit 26 deletes the subject 3E (the object image 6-6) included in the image P3 and combines the object image 6-8, thereby obtaining an image P4 in which the subject 3E which has been the background is replaced as the foreground.

The replacement of objects has been described above. Next, delete of an object, which is one example of the composition process, will be described with reference to FIG. 7.

Delete of Object

Figure 7:
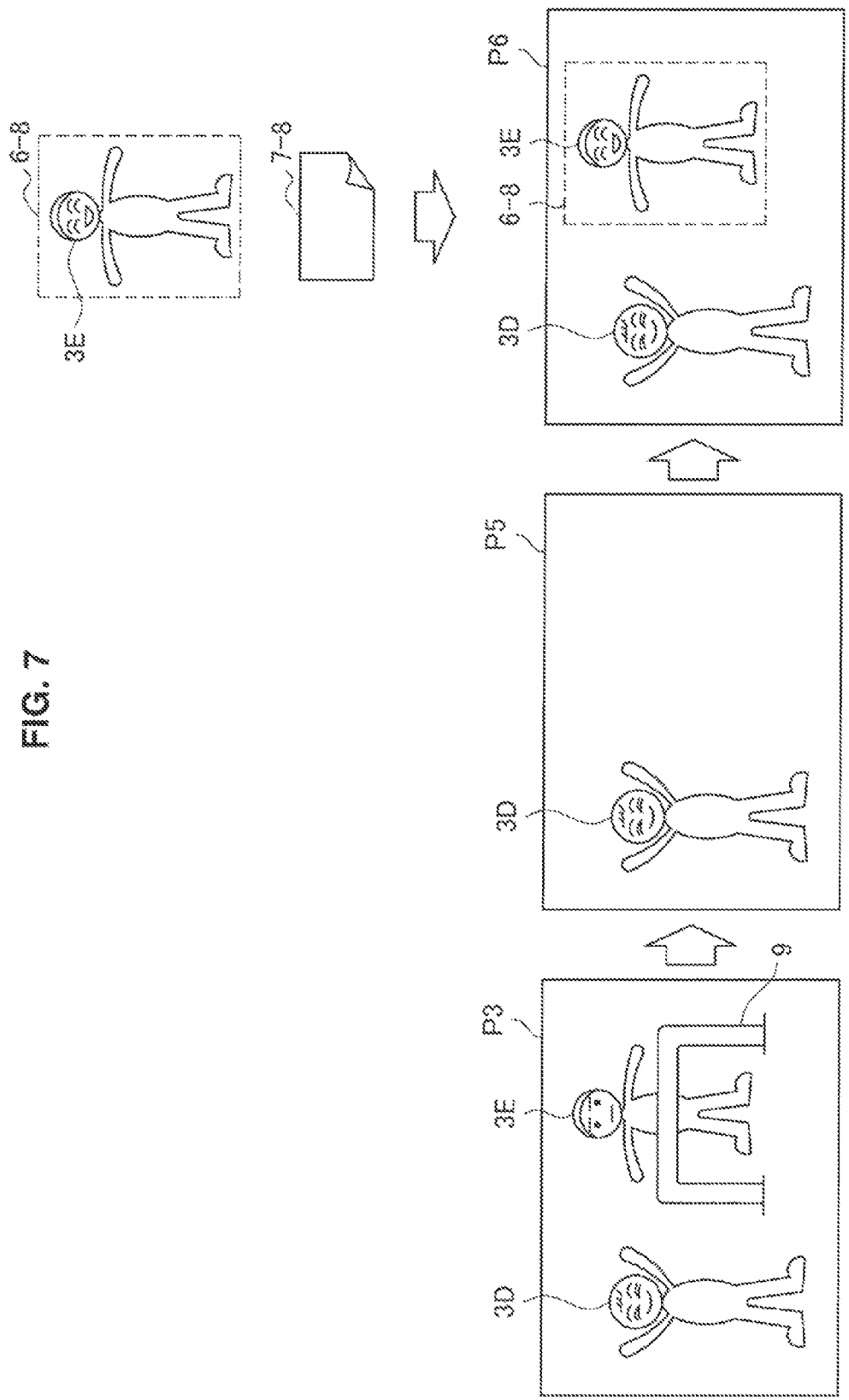
FIG. 7 shows an example of a composition process according to a first embodiment.

FIG. 7 shows an example of the composition process according to the first embodiment. As shown in FIG. 7, the server 2-1 performs the composition process targeting the image P3 described above with reference to FIG. 4. Note that the server 2-1 has received, together with the image P3, target object information indicating that the fence 9 is a target of delete, from the camera 1-1.

In this case, first, the extraction unit 22 extracts the object images 6-4, 6-5, and 6-6 from the image P3, as described above with reference to FIG. 4, and acquires the respective pieces of the object attribute information (steps S212 and S216).

Next, the composition unit 26 deletes the object images 6-5 and 6-6 from the image P3, thereby obtaining an image P5 in which the fence 9 and the subject 3E are deleted. This is because since the subject 3E is behind the fence 9 at the time of picking up the image, simple delete of the fence 9 would produce an unnatural image in which a part of the trunk of the subject 3E is not imaged.

Next, the record control unit 24 searches for an object candidate image in which the subject 3E is imaged and there is part that is not imaged. More specifically, the record control unit 24 searches the memory unit 25 for an object candidate image corresponding to the subject 3E in the image P3 and in association with flag information indicating that the object is the foreground.

Here, if the memory unit 25 has recorded the object image 6-8 and the object attribute information 7-8 which are described above with reference to FIG. 6, the record control unit 24 searches for the object image 6-8 as the object candidate image. Then, the composition unit 26 combines the object image 6-8 in a region in the image P5, the region corresponding to a region of the subject 3E in the image P3, thereby obtaining an image P6 in which the fence 9 is deleted from the image P3.

The delete of the object has been described above. Next, compensation of an object, which is one example of the composition process, will be described with reference to FIG. 8.

Compensation of Object

Figure 8:
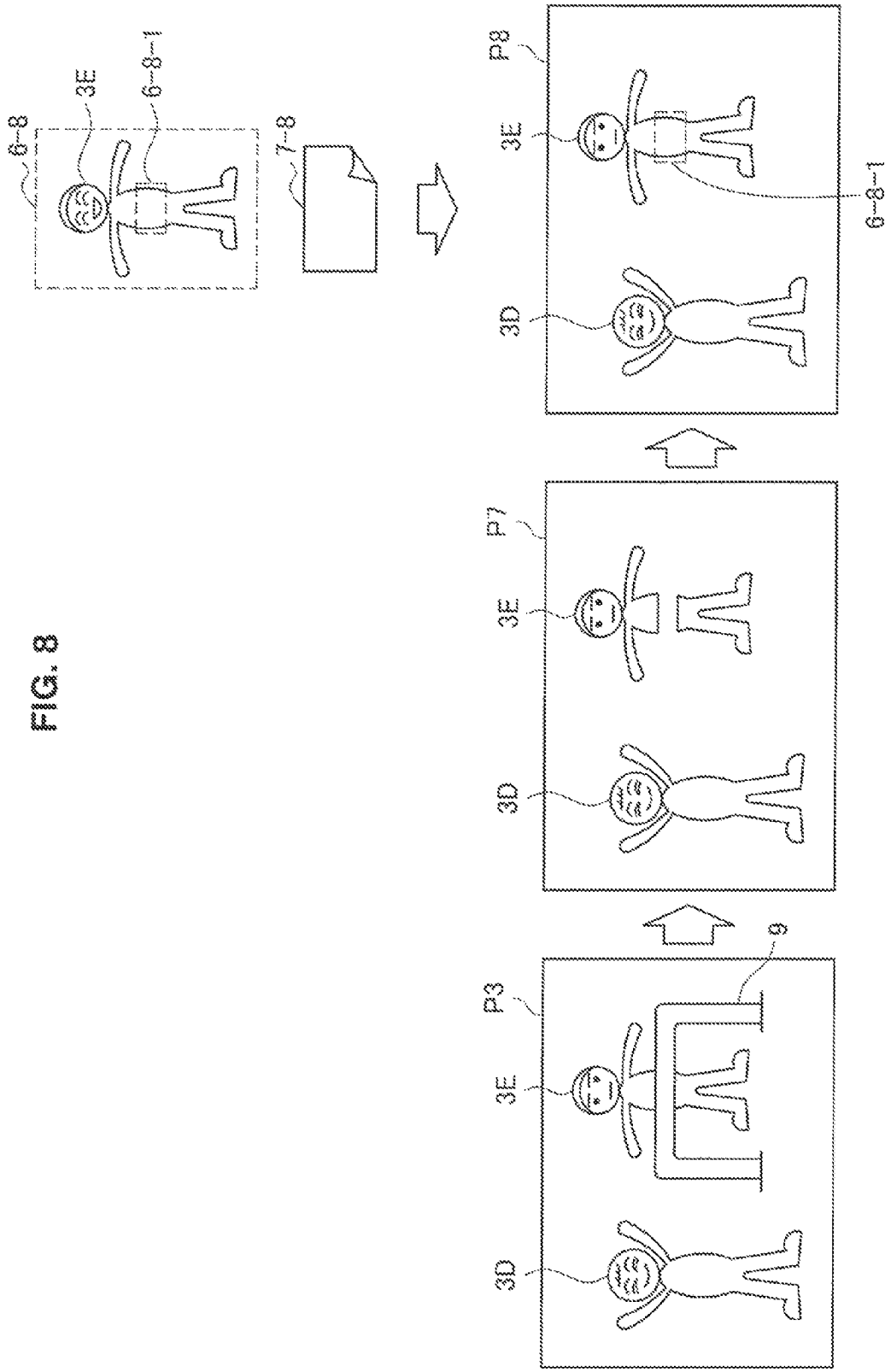
FIG. 8 shows an example of a composition process according to a first embodiment.

FIG. 8 shows an example of the composition process according to the first embodiment. As shown in FIG. 8, the server 2-1 performs the composition process targeting the image P3 described above with reference to FIG. 4. Note that the server 2-1 has received, together with the image P3, target object information indicating that the fence 9 is a target of delete, from the camera 1-1.

In this case, first, the extraction unit 22 extracts the object images 6-4, 6-5, and 6-6 from the image P3 as described above with reference to FIG. 4, and obtains the respective pieces of the object attribute information (steps S212 and S216).

Next, the composition unit 26 deletes the object image 6-5 from the image P3, thereby obtaining an image P7 from which the fence 9 is deleted. As shown in FIG. 8, since the subject 3E imaged in the image P7 is behind the fence 9 which is the target of delete at the time of picking up the image, an unnatural state is generated in which a part of the trunk of the subject 3E is not imaged. Thus, the record control unit 24 searches the memory unit 25 for an object candidate image corresponding to the subject 3E in the image P7 and in association with flag information indicating that the object is the foreground.

Here, if the server 2-1 stores the object image 6-8 and the object attribute information 7-8 which are described above with reference to FIG. 6, the record control unit 24 searches for the object image 6-8 as the object candidate image. Then, the composition unit 26 combines a region 6-8-1 corresponding to the object image 6-8 in a lacking region of the trunk of the subject 3E included in the image P5, thereby obtaining an image P8 in which the lacking part in the image P7 is compensated for.

The compensation of the object has been described above. Next, addition of an object, which is one example of the composition process, will be described with reference to FIG. 9.

Addition of Object

Figure 9:
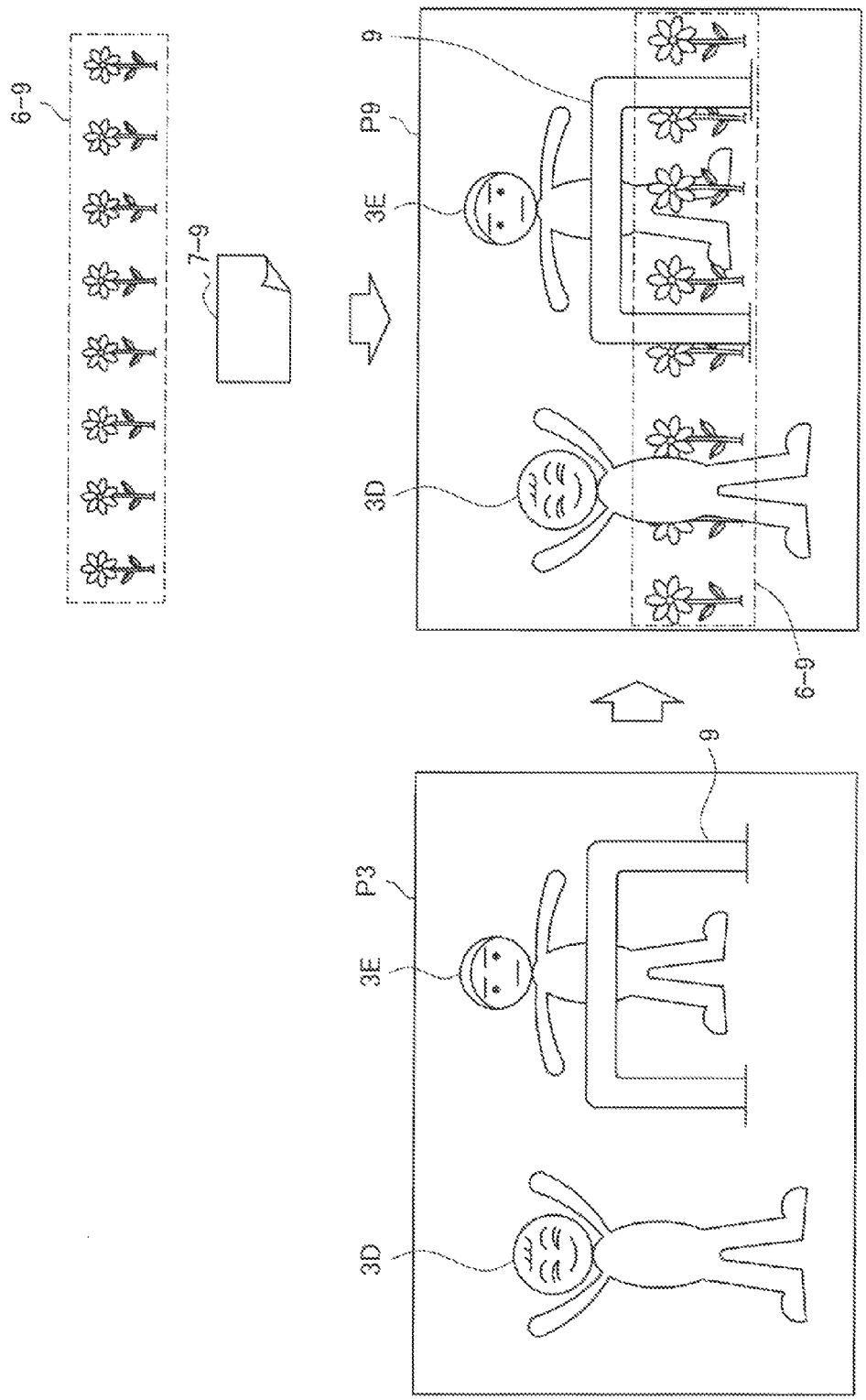
FIG. 9 shows an example of a composition process according to a first embodiment.

FIG. 9 shows an example of the composition process according to the first embodiment. As shown in FIG. 9, the server 2-1 performs the composition process targeting the image P3 described above with reference to FIG. 4. Note that the server 2-1 has received, together with the image P3, the composition instructing information instructing to add a field of flowers to a region between the foreground and the background, from the camera 1-1.

In this case, first, the extraction unit 22 extracts the object images 6-4, 6-5, and 6-6 from the image P3 as described above with reference to FIG. 4, thereby acquiring the respective pieces of the object attribute information (steps S212 and S216).

Here, let up assume that the server 2-1 has stored an object image 6-9 in which a field of flowers is imaged and object attribute information 7-9.

Next, the record control unit 24 searches for an object candidate image in which a field of flowers is imaged and the image pickup distance is between the foreground and the background of the image P3. More specifically, first, on the basis of the object attribute information of the object images 6-4 and 6-5 which are the foreground and of the object image 6-6 which is the background in the image P3, the record control unit 24 calculates the image pickup distance of a halfway point between the foreground and the background. Then, the record control unit 24 searches the memory unit 25 for an object candidate image in which a field of flowers is imaged and in association with the calculated image pickup distance.

Here, let us assume that the server 2-1 has stored the object image 6-9 in which a field of flowers is imaged and the object attribute information 7-9 through a previous accumulation process. The object attribute information 7-9 is the same as or similar to the object attribute information of the object images 6-4, 6-5, and 6-6 except for the distance information and the image pickup distance indicated by the distance information is equal or almost equal to the calculated image pickup distance of the halfway point.

Thus, the record control unit 24 searches for the object image 6-9 as the object candidate image. Then, on the basis of flag information of the object images 6-4, 6-5, and 6-6 included in the image P3, the composition unit 26 combines the object image 6-9 behind the object images 6-4 and 6-5 and in front of the object image 6-6. At this time, on the basis of the distance information of the object images 6-4, 6-5, 6-6, and 6-9, the composition unit 26 may execute composition by adjusting the depth, size, and the like of the object image 6-9 to be added. In this manner, the server 2-1 obtains the image P9 in which the field of flowers is added to a region between the foreground, which is the subject 3D and the fence 9, and the background, which is the subject 3E, in the image P3.

The addition of the object has been described above.

Supplement

Although the specific examples described with reference to FIG. 6 to FIG. 9 have been described by omitting backgrounds such as a sky, a mountain, a ground, and a building, the server 2-1 can compensate for an object of the background as a target in the above various composition processes, so as to prevent the lack of the background. For example, in the example described with reference to FIG. 8, in a case where the fence 9 is deleted, not only the trunk part of the subject 3E but also a background such as a ground that is not imaged by overlapping with the fence 9 may lack. In this case, the server 2-1 can search, as a target of compensation of the background such as the ground, for an object candidate image in which the background is imaged and perform compensation, thereby executing natural image composition in which the background does not lack.

2-2. Second Embodiment

In this embodiment, most of processes related to the composition process and the accumulation process are performed in the camera 1-1. Since the content of the composition process is the same as that described in the first embodiment above, the same part will be omitted. First, a configuration of an image composition system will be described with reference to FIG. 10.

[2-2-1. Configuration of Image Composition System]

Figure 10:
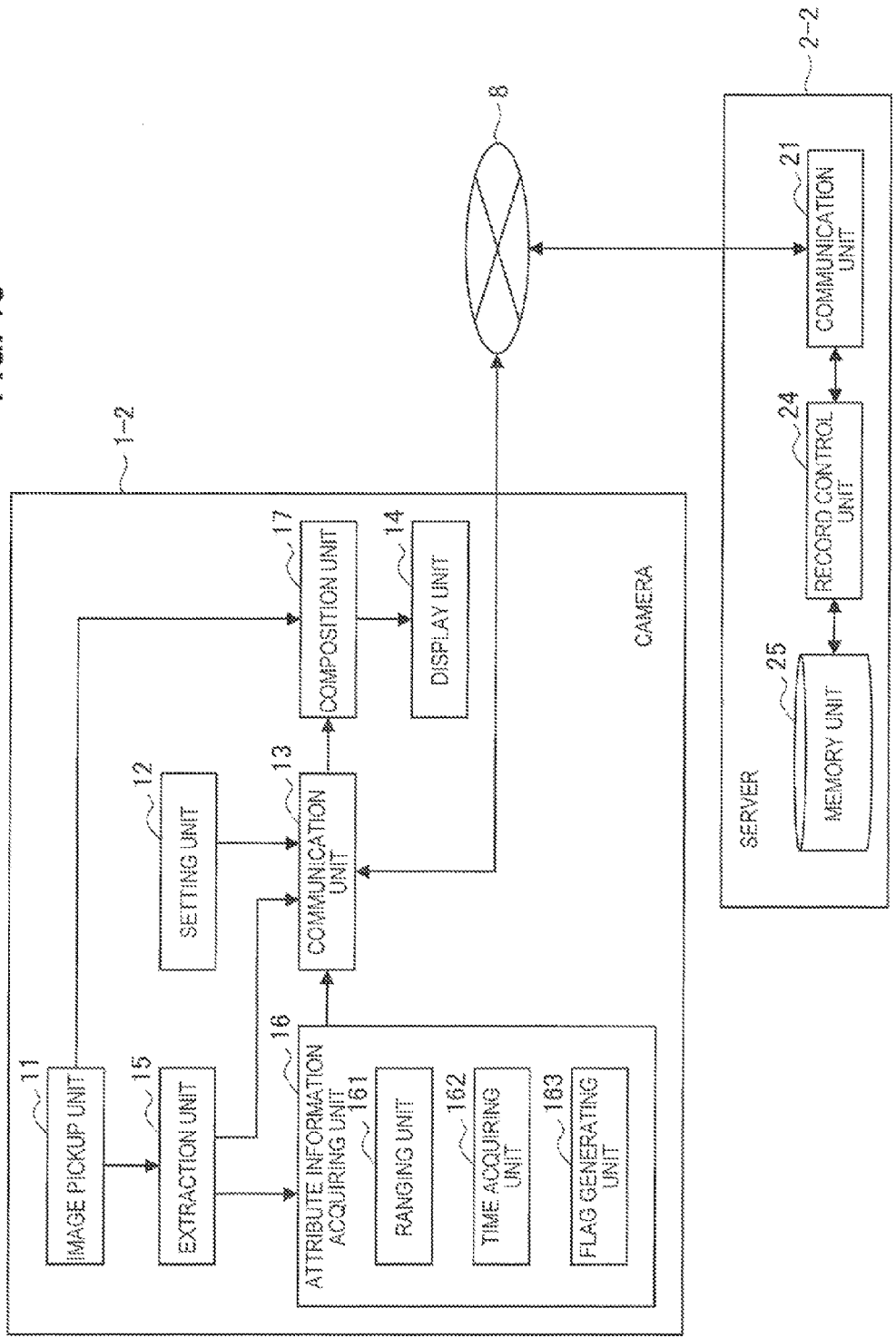
FIG. 10 is a block diagram showing a configuration of an image composition system according to a second embodiment.

FIG. 10 is a block diagram showing a configuration of an image composition system according to a second embodiment. As shown in FIG. 10, the image composition system includes a camera 1-2 (external device) and a server 2-2 which are mutually connected via the network 8.

(Network 8)

The network 8 has the configuration as described in the first embodiment.

(Camera 1-2)

As shown in FIG. 10, the camera 1-2 includes the image pickup unit 11, the setting unit 12, the communication unit 13, and the display unit 14 which are described in the first embodiment, and in addition, an extraction unit 15, an attribute information acquiring unit 16, and a composition unit 17.

Image Pickup Unit 11

The image pickup unit 11 has the function as described in the first embodiment, and outputs a pickup image and imaging parameters to the extraction unit 15 and the composition unit 17.

Setting Unit 12

The setting unit 12 has the function as described in the first embodiment, and generates and outputs composition instructing information or accumulation instructing information to the communication unit 13.

Extraction Unit 15

The extraction unit 15 has the same function as the extraction unit 22 described in the first embodiment. The extraction unit 15 outputs an object extracted from the pickup image and the imaging parameters to the attribute information acquiring unit 16 and the communication unit 13.

Attribute Information Acquiring Unit 16

The attribute information acquiring unit 16 has the same function as the attribute information acquiring unit 23 described in the first embodiment. The attribute information acquiring unit 16 functions as a ranging unit 161, a time acquiring unit 162, and a flag generating unit 163.

Ranging Unit 161

The ranging unit 161 has the same function as the ranging unit 231 described in the first embodiment, and outputs acquired distance information to the communication unit 13. Here, the ranging unit 161 according to this embodiment can not only acquire distance information on the basis of the pickup image and the imaging parameters but also acquire distance information by a variety of methods. For example, the ranging unit 161 may acquire distance information by a time-of-flight (TOF) method on the basis of a time from when a light source is made to emit light to when reflected light is received. Further, in a case where the camera 1-2 includes a plurality of the image pickup units 11, the ranging unit 161 may acquire distance information by use of a stereoscopy technique performed by the plurality of image pickup units 11. Alternatively, the ranging unit 161 may acquire distance information by use of an electronic distance meter, an optical parallax distance meter, or the like.

Time Acquiring Unit 162

The time acquiring unit 162 has the same function as the time acquiring unit 232 described in the first embodiment, and outputs generated time information to the communication unit 13.

Flag Generating Unit 163

The flag generating unit 163 has the same function as the flag generating unit 233 described in the first embodiment, and outputs generated flag information to the communication unit 13.

Communication Unit 13

The communication unit 13 communicates with the server 2-2 via the network 8 as described in the first embodiment.

In a case where the setting unit 12 outputs accumulation instructing information, the communication unit 13 according to this embodiment transmits an object image (a first image) extracted by the extraction unit 15 to the server 2-2 in association with object attribute information and the accumulation instructing information. Here, the object attribute information contains distance information, time information, and flag information output from the attribute information acquiring unit 16, and the imaging parameters. Note that such a function of transmitting the object image and the object attribute information together with the accumulation instructing information can be regarded as a first transmission function.

In a case where the setting unit 12 outputs composition instructing information, the communication unit 13 according to this embodiment transmits an object image (a second image) extracted by the extraction unit 15 to the server 2-2 in association with the object attribute information and the composition instructing information. Note that such a function of transmitting the object image and the object attribute information together with the composition instructing information can be regarded as a second transmission function.

At this time, the communication unit 13 outputs an object candidate image extracted by the extraction unit 15, the object attribute information, and the composition instructing information to the composition unit 17. Further, the communication unit 13 outputs an object candidate image that is found on the basis of the composition instructing information in the server 2-2, which is received from the server 2-2, to the composition unit 17.

Composition Unit 17

The composition unit 17 has the same function as the composition unit 26 described in the first embodiment. The composition unit 17 according to this embodiment generates a composite image in which the object candidate image received by the communication unit 13 is combined with the pickup image output from the image pickup unit 11 on the basis of the object attribute information and the composition instructing information.

Display Unit 14

The display unit 14 displays a pickup image picked up by the image pickup unit 11 in real time and displays the composite image output from the composition unit 17, for example, as described in the first embodiment. Further, the display unit 14 may arrange and display a plurality of the object candidate images received from the server 2-2 together with the pickup image picked up by the image pickup unit 11. Further, the display unit 14 may switch and display the composite image formed using the object candidate image that is selected on the basis of a user's operation.

The configuration of the camera 1-2 has been described above. Next, the configuration of the server 2-2 will be described.

(Server 2-2)

As shown in FIG. 2, the server 2-2 includes the communication unit 21, the record control unit 24, and the memory unit 25 which are described in the first embodiment.

Communication Unit 21

The communication 21 communicates with the camera 1-2 via the network 8 as described in the first embodiment. In a case where composition instructing information is received, the communication unit 21 according to this embodiment transmits the object candidate image found by the record control unit 24 to the camera 1-2.

Record Control Unit 24

The record control unit 24 has the same function as the record control unit 24 described in the first embodiment.

In a case where accumulation instructing information is received, the record control unit 24 according to this embodiment records the received object image in the memory unit 25 in association with the object attribute information. At this time, the record control unit 24 may add identification information to the object attribute information through image recognition of the received object image to record the object image in the memory unit 25.

Meanwhile, in a case where composition instructing information is received, the record control unit 24 according to this embodiment searches the memory unit 25 for an object candidate image corresponding to the received object image on the basis of the received object attribute information. Then, the record control unit 24 outputs the found object candidate image to the communication unit 21.

Memory Unit 25

The memory unit 25 records the object image in association with the object attribute information under control of the record control unit 24 as described in the first embodiment.

The configuration of the image composition system according to this embodiment has been described above. Next, the operation process of the image composition system according to this embodiment will be described with reference to FIG. 11 and FIG. 12.

[2-2-2. Operation Process of Image Composition System]

(Accumulation Process)

Figure 11:
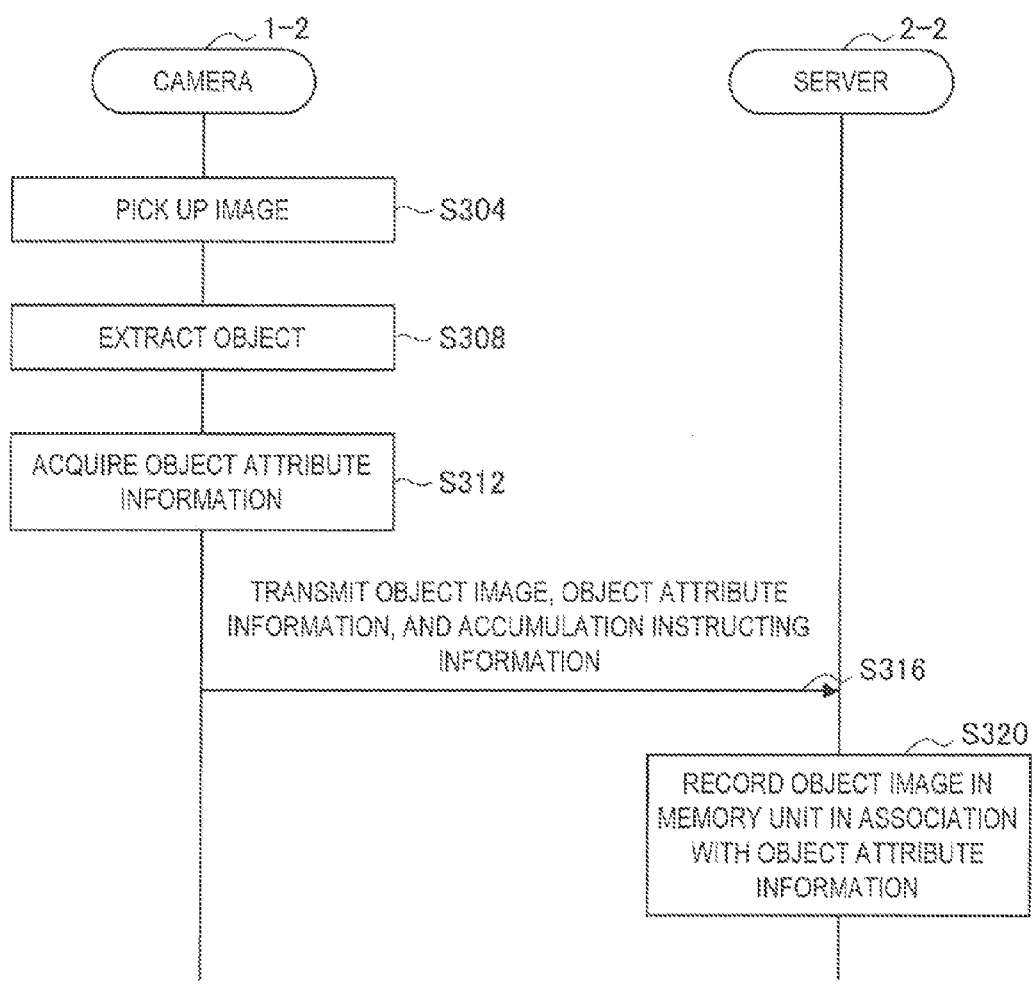
FIG. 11 is a flowchart showing an accumulation process according to a second embodiment.

FIG. 11 is a flowchart showing an accumulation process according to the second embodiment. As shown in FIG. 3, first, in step S304, the image pickup unit 11 of the camera 1-2 picks up an image by use of certain imaging parameters.

Next, in step S308, the extraction unit 15 of the camera 1-2 extracts an object from the pickup image, and in step S312, the attribute information acquiring unit 16 acquires object attribute information.

Next, in step S316, the communication unit 13 of the camera 1-2 transmits the object image extracted by the extraction unit 15 to the server 2-2 in association with object attribute information containing the information acquired by the attribute information acquiring unit 16 and the imaging parameters and accumulation instructing information.

Then, in step S320, the record control unit 24 of the server 2-2 records the object image received by the communication unit 21 in the memory unit 25 in association with object attribute information to which identification information is further added.

The accumulation process performed by the image composition system has been described above. Next, a composition process performed by the image composition system will be described with reference to FIG. 12.

(Composition Process)

Figure 12:
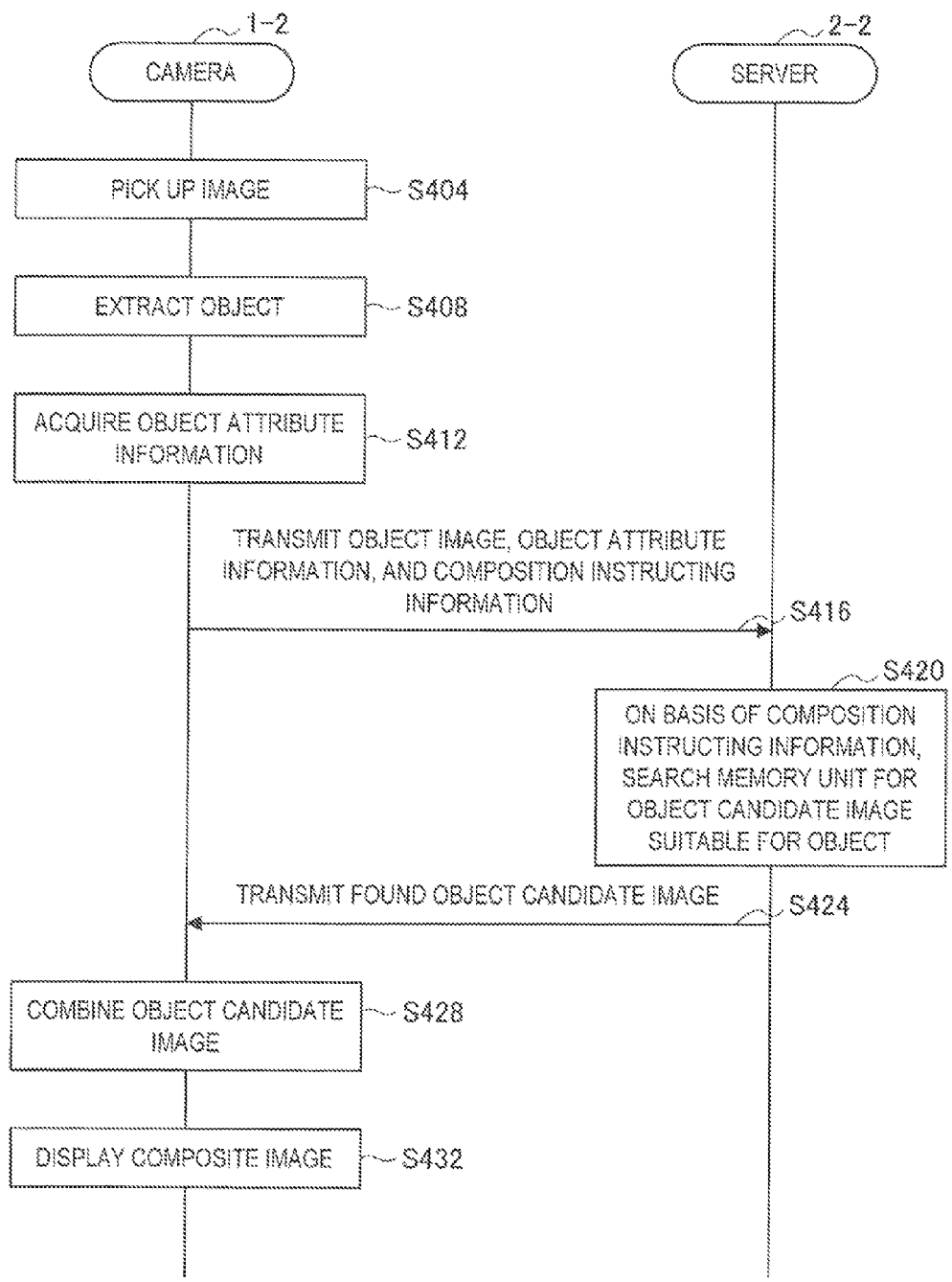
FIG. 12 is a flowchart showing a composition process according to a second embodiment.

FIG. 12 is a flowchart showing a composition process according to the second embodiment. As shown in FIG. 12, first, in step S404, the image pickup unit 11 of the camera 1-2 picks up an image by use of certain imaging parameters.

Next, in step S408, the extraction unit 15 of the camera 1-2 extracts an object from the pickup image, and in step S412, the attribute information acquiring unit 16 acquires object attribute information.

Next, in step S416, the communication unit 13 of the camera 1-2 transmits the object image to the server 2-2 in association with the object attribute information containing the imaging parameters and the like and composition instructing information.

Then, in step S420, the record control unit 24 of the server 2-2 searches the memory unit 25 for an object candidate image that is suitable for the received object that is a composition target on the basis of the received composition instructing information.

Next, in step S424, the communication unit 21 of the server 2-2 transmits the object candidate image that is found by the record control unit 24 to the camera 2-1.

Then, in step S428, the composition unit 17 of the camera 1-2 combines the object candidate image received from the server 2-2 with the pickup image picked up by the image pickup unit 11 on the basis of the composition instructing information, thereby generating a composite image.

Next, in step S432, the display unit 14 of the camera 1-2 displays the composite image generated by the composition unit 17.

The composition process performed by the image composition system has been described above.

3. CONCLUSION

As described above, an image composition system according to an embodiment of the present disclosure can execute easy and natural image composition by recording beforehand an object image in association with object attribute information. Further, the image composition system executes a composition process by use of flag information, distance information, and the like, thereby being able to execute natural image composition without a lack.

Since the image composition system enables search to prioritize given object attribute information on the basis of priority information, a composite image desired by a user can be generated easily and naturally.

It should be understood by those skilled in the art that various modifications, combinations, sub-combinations and alterations may occur depending on design requirements and other factors insofar as they are within the scope of the appended claims or the equivalents thereof.

For example, most processes related to the composition process and the accumulation process are performed by the camera 1 or the server 2 in the above embodiment; however, the present technology is not limited to those examples. For example, the composition process and the accumulation process may be divided as appropriate and may be executed by the camera 1 or the server 2 independently. That is, any of the camera 1 and the server 2 may include configurations such as the extraction unit, the attribute information acquiring unit, and the composition unit.

Further, the camera 1 is used as an example of an image processing device in the above embodiments; however, the image processing device according to embodiments of the present disclosure is not limited to this. For example, the image processing device may be a head mounted display (HMD), a head set, a digital video camera, a personal digital assistant (PDA), a personal computer (PC), a laptop PC, a tablet terminal, a smartphone, a mobile phone terminal, a mobile music playback device, a mobile video processing device, a mobile game machine, and the like.

Further, it is possible to create a computer program for causing hardware such as a CPU, ROM, or RAM incorporated in an information processing device to execute the same function as each configuration of the above camera 1 or server 2. It is also possible to provide a recording medium having the computer program recorded thereon.

Additionally, the present technology may also be configured as below.

(1)

An image processing device including:
    an extraction unit configured to extract an object from an image picked up by use of a certain imaging parameter;
    a ranging unit configured to acquire distance information indicating a distance between an image pickup unit that has picked up the image and the object that has been imaged;
    a communication unit having
        a first transmission function that transmits an object image showing the object extracted by the extraction unit from a first image to an external device in association with object attribute information containing the distance information and the certain imaging parameter, the distance information being acquired by the ranging unit from the first image,
        a second transmission function that transmits second image that is different from the first image to the external device, and
        a reception function that receives the object image showing the object extracted from the first image, the object image corresponding to the object included in the second image, from the external device as an object candidate image; and
    a composition unit configured to combine the object candidate image received by the communication unit in a region of the object included in the second image.

(2)

The image processing device according to (1), wherein the communication unit further transmits the object attribute information of the second image and receives the object candidate image in association with the object attribute information that is suitable for the transmitted object attribute information.

(3)
The image processing device according to (2), wherein the communication unit further transmits priority information indicating the object attribute information that is to be prioritized and receives the object candidate image in association with the prioritized object attribute information indicated by the transmitted priority information.

(4)
The image processing device according to any one of (1) to (3), further including:
a flag generating unit configured to generate flag information indicating whether or not the object extracted by the extraction unit is a foreground,
wherein the object attribute information further contains the flag information generated by the flag generating unit.

(5)
The image processing device according to any one of (1) to (4), wherein the composition unit combines the object candidate image on the basis of the object attribute information of the second image.

(6)
The image processing device according to any one of (1) to (5), further including:
a time acquiring unit configured to generate time information indicating a time at which the object has been imaged,
wherein the object attribute information further contains the time information generated by the time acquiring unit.

(7)
The image processing device according to any one of (1) to (6), wherein the second image is the object image showing the object extracted by the extraction unit from an image different from the first image picked up by the image pickup unit.

(8)
A server including:
a communication unit configured to receive an image picked up by use of a certain imaging parameter and the imaging parameter from an external device;
an extraction unit configured to extract an object from the image received by the communication unit;
a ranging unit configured to acquire distance information indicating a distance between an image pickup unit that has picked up the image and the object that has been imaged;
a record control unit configured to record an object image showing the object extracted by the extraction unit from a first image received by the communication unit in a memory unit in association wits object attribute information containing the distance information and the certain imaging parameter, the distance information being acquired by the ranging unit from the first image; and
a composition unit configured to combine the object image recorded in the memory unit with the image received by the communication unit,
wherein, on the basis of the object attribute information containing the distance information acquired by the ranging unit from a second image that is different from the first image received by the communication unit and the certain imaging parameter, the record control unit searches the memory unit for the object image showing the object extracted from the first image, the object image corresponding to the object extracted by the extraction unit from the second image, as an object candidate image,
wherein the composition unit generates a composite image in which the object candidate image found by the record control unit is combined in a region of the object included in the second image, and
wherein the communication unit transmits the composite image combined by the composition unit to the external device.

(9)
The server according to (8),
wherein the communication unit further receives priority information indicating the object attribute information that is to be prioritized, and
wherein, on the basis of the prioritized object attribute information indicated by the priority information received by the communication unit, the record control unit searches the memory unit for the object candidate image corresponding to the object extracted by the extraction unit.

(10)
The server according to (8) or (9), further including:
a flag generating unit configured to generate flag information indicating whether or not the object extracted by the extraction unit is a foreground,
wherein the object attribute information further contains the flag information generated by the flag generating unit.

(11)
The server according to any one of (8) to 10),
wherein the imaging parameter includes information related to an image pickup lens of the image pickup unit that has picked up the first image and information indicating an inclination and direction of the image pickup unit, and
wherein the record control unit records the object attribute information further containing time information indicating a time at which the first image has been picked up.

(12)
A non-transitory computer-readable storage medium having a program stored therein, the program causing a computer to execute:
extracting an object from an image picked up by use of a certain imaging parameter;
acquiring distance information indicating a distance between an image pickup unit that has picked up the image and the object that has been imaged;
transmitting an object image showing the object extracted from a first image to an external device in association with object attribute information containing the distance information and the certain imaging parameter, the distance information being acquired from the first image;
transmitting a second image that is different from the first image to the external device;
receiving the object image showing the object extracted from the first image, the object image corresponding to the object included in the second image, from the external device as an object candidate image; and
combining the received object candidate image in a region of the object included in the second image.

(13)
A non-transitory computer-readable storage medium having a program stored therein, the program causing a computer to execute:
receiving an image picked up by use of a certain imaging parameter and the imaging parameter from an external device;
extracting an object from the received image;
acquiring distance information indicating a distance between an image pickup unit that has picked up the image and the object that has been imaged;
recording an object image showing the object extracted from a received first image in a memory unit in association with object attribute information containing the distance information and the certain imaging parameter, the distance information being acquired from the first image;

on the basis of the object attribute information containing the distance information acquired from a received second image that is different from the first image and the certain imaging parameter, searching the memory unit for the object image showing the object extracted from the first image, the object image corresponding to the object extracted from the second image, as an object candidate image;

generating a composite image in which the found object candidate image is combined in a region of the object included in the second image; and transmitting the generated composite image to the external device.

What is claimed is:

1. An image processing device comprising:
    an extraction unit configured to extract an object from an image picked up by use of a certain imaging parameter;
    a ranging unit configured to acquire distance information indicating a distance between an image pickup unit that has picked up the image and the object that has been imaged;
    a communication unit having
        a first transmission function that transmits an object image showing the object extracted by the extraction unit from a first image to an external device in association with object attribute information containing the distance information and the certain imaging parameter, the distance information being acquired by the ranging unit from the first image,
        a second transmission function that transmits a second image that is different from the first image to the external device, and
        a reception function that receives the object image showing the object extracted from the first image, the object image corresponding to the object included in the second image, from the external device as an object candidate image; and
    a composition unit configured to combine the object candidate image received by the communication unit in a region of the object included in the second image.

2. The image processing device according to claim 1, wherein the communication unit further transmits the object attribute information of the second image and receives the object candidate image in association with the object attribute information that is suitable for the transmitted object attribute information.

3. The image processing device according to claim 2, wherein the communication unit further transmits priority information indicating the object attribute information that is to be prioritized and receives the object candidate image in association with the prioritized object attribute information indicated by the transmitted priority information.

4. The image processing device according to claim 1, further comprising:
    a flag generating unit configured to generate flag information indicating whether or not the object extracted by the extraction unit is a foreground,
    wherein the object attribute information further contains the flag information generated by the flag generating unit.

5. The image processing device according to claim 1, wherein the composition unit combines the object candidate image on the basis of the object attribute information of the second image.

6. The image processing device according to claim 1, further comprising:

a time acquiring unit configured to generate time information indicating a time at which the object has been imaged,
wherein the object attribute information further contains the time information generated by the time acquiring unit.

7. The image processing device according to claim 1, wherein the second image is the object image showing the object extracted by the extraction unit from an image different from the first image picked up by the image pickup unit.

8. A server comprising:
    a communication unit configured to receive an image picked up by use of a certain imaging parameter and the imaging parameter from an external device;
    an extraction unit configured to extract an object from the image received by the communication unit;
    a ranging unit configured to acquire distance information indicating a distance between an image pickup unit that has picked up the image and the object that has been imaged;
    a record control unit configured to record an object image showing the object extracted by the extraction unit from a first image received by the communication unit in a memory unit in association with object attribute information containing the distance information and the certain imaging parameter, the distance information being acquired by the ranging unit from the first image; and
    a composition unit configured to combine the object image recorded in the memory nit with the image received by the communication unit,
    wherein, on the basis of the object attribute information containing the distance information acquired by the ranging unit from a second image that is different from the first image received by the communication unit and the certain imaging parameter, the record control unit searches the memory unit for the object image showing the object extracted from the first image, the object image corresponding to the object extracted by the extraction unit from the second image, as an object candidate image,
    wherein the composition unit generates a composite image in which the object candidate image found by the record control unit is combined in a region of the object included in the second image, and
    wherein the communication unit transmits the composite image combined by the composition unit to the external device.

9. The server according to claim 8,
    wherein the communication unit further receives priority information indicating the object attribute information that is to be prioritized, and
    wherein, on the basis of the prioritized object attribute information indicated by the priority information received by the communication unit, the record control unit searches the memory unit for the object candidate image corresponding to the object extracted by the extraction unit.

10. The server according to claim 8, further comprising:
    a flag generating unit configured to generate flag information indicating whether or not the object extracted by the extraction unit is a foreground,
    wherein the object attribute information further contains the flag information generated by the flag generating unit.

11. The server according to claim 8,
    wherein the imaging parameter includes information related to an image pickup lens of the image pickup unit that has picked up the first image and information indicating an inclination and direction of the image pickup unit, and wherein the record control unit records the object attribute information further containing time information indicating a time at which the first image has been picked up.

12. A non-transitory computer-readable storage medium having a program stored therein, the program causing a computer to execute:

extracting an object from an image picked up by use of a certain imaging parameter;

acquiring distance information indicating a distance between an image pickup unit that has picked up the image and the object that has been imaged;

transmitting an object image showing the object extracted from a first image to an external device in association with object attribute information containing the distance information and the certain imaging parameter, the distance information being acquired from the first image;

transmitting a second image that is different from the first image to the external device;

receiving the object image showing the object extracted from the first image, the object image corresponding to the object included in the second image, from the external device as an object candidate image; and combining the received object candidate image in a region of the object included in the second image.

13. A non-transitory computer-readable storage medium having a program stored therein, the program causing a computer to execute:

receiving an image picked up by use of a certain imaging parameter and the imaging parameter from an external device;

extracting an object from the received image;

acquiring distance information indicating a distance between an image pickup unit that has picked up the image and the object that has been imaged;

recording an object image showing the object extracted from a received first image in a memory unit in association with object attribute information containing the distance information and the certain imaging parameter, the distance information being acquired from the first image;

on the basis of the object attribute information containing the distance information acquired from a received second image that is different from the first image and the certain imaging parameter, searching the memory unit for the object image showing the object extracted from the first image, the object image corresponding to the object extracted from the second image, as an object candidate image;

generating a composite image in which the found object candidate image is combined in a region of the object included in the second image; and transmitting the generated composite image to the external device.

* * * * *